(12) United States Patent
    Ulrich

(10) Patent No.: US 8,679,340 B1
(45) Date of Patent: Mar. 25, 2014

(54) METHOD TO STIMULATE AND SUSTAIN THE ANAEROBIC BIODEGRADATION OF LIGHT NON-AQUEOUS PHASE LIQUID

(71) Applicant: Parsons Corporation, Pasadena, CA (US)

(72) Inventor: Glenn Ulrich, Rolla, MO (US)

(73) Assignee: Parsons Corporation, Pasadena, CA (US)

( * ) Notice: Subject to any disclaimer, the term of this patent is extended or adjusted under 35 U.S.C. 154(b) by 0 days.

(21) Appl. No.: 13/927,453

(22) Filed: Jun. 26, 2013

Related U.S. Application Data

(63) Continuation of application No. PCT/US2013/023268, filed on Jan. 25, 2013.

(51) Int. Cl.
    *C02F 3/00* (2006.01)

(52) U.S. Cl.
    USPC ............ 210/605; 210/610; 210/611; 210/614

(58) Field of Classification Search
    USPC .................................. 210/605, 610–611, 614
    See application file for complete search history.

(56) References Cited

U.S. PATENT DOCUMENTS

| | | | | |
|---|---|---|---|---|
| 6,562,235 | B1* | 5/2003 | Newell et al. | 210/601 |
| 6,787,034 | B2* | 9/2004 | Noland et al. | 210/610 |
| 2002/0166813 | A1* | 11/2002 | Bartlett | 210/610 |

* cited by examiner

*Primary Examiner* — Chester Barry
(74) *Attorney, Agent, or Firm* — Norman R. Van Treeck; Sheldon Mak & Anderson, PC (57) ABSTRACT

A method for treating LNAPL source zones using a cost effective LNAPL source zone technology to degrade residual LNAPL, by introducing bioremediation amendments comprising nutritional supplements in quantities, locations, and depths required to stimulate and sustain the anaerobic biodegradation of an LNAPL source zone; monitoring the LNAPL source zone for adverse conditions that decrease anaerobic LNAPL biodegradation; eliminating any identified adverse conditions to sustain LNAPL biodegradation; and maintaining the water with nutritional supplements in quantities, locations, and depths required to stimulate and sustain the anaerobic biodegradation of LNAPL.

24 Claims, 3 Drawing Sheets

METHOD TO STIMULATE AND SUSTAIN THE ANAEROBIC BIODEGRADATION OF LIGHT NON-AQUEOUS PHASE LIQUID

CROSS-REFERENCE TO RELATED APPLICATIONS

This application is a continuation of and claims priority to International Patent Application No. PCT/US2013/023268, entitled "METHOD TO STIMULATE AND SUSTAIN THE ANAEROBIC BIODEGRADATION OF LIGHT NON-AQUEOUS PHASE LIQUID," filed on Jan. 25, 2013.

FIELD OF THE INVENTION

The present invention relates to bioremediation and more particularly to methods to stimulate and sustain the anaerobic biodegradation of light non-aqueous phase liquid (LNAPL).

BACKGROUND

The environmental remediation industry needs more effective technologies for light non-aqueous phase liquid (LNAPL, including residual phase LNAPL) remediation and the associated dissolved-phase of benzene, toluene, ethylbenzene, and xylenes (BTEX) plumes, especially where the aerial extent of contamination is large and not practicable to remediate using existing technologies. LNAPL recovery by extracting fluids via pumping and/or other means, recovers a portion of the LNAPL with the remaining residual LNAPL being held by capillary forces in soil porosity. The long-term pumping of fluids reaches a point of diminishing LNAPL recovery relative to the costs required to maintain recovery systems. The remaining LNAPL often serves as a continuing source of dissolved hydrocarbon plumes including BTEX and low molecular weight poly-aromatic hydrocarbons (or polynuclear aromatic hydrocarbons) (PAH) such as naphthalene. Cost effective approaches to remove or degrade residual LNAPL do not exist. Large areas of residual LNAPL therefore remain at numerous sites including terminals and refineries across the world. Existing technologies used to enhance the recovery of the remaining LNAPL include excavating the impacted soils, surfactant and/or solvent flooding, various in-situ heating approaches (steam flooding, electrical resistance heating, among others) and air-sparging. These approaches are costly and often not reasonable to apply over broad areas of LNAPL impacted soil, nor practical at some facilities with extensive build-out or development. Existing technologies used to degrade LNAPL in-situ include chemical oxidation injections and burning LNAPL below ground; the former is costly over larger areas and the latter is in an experimental stage.

Enhancing the aerobic biodegradation of LNAPL is limited by the low solubility of dissolved oxygen and difficulty in distributing oxygen in the subsurface. Anaerobic conditions predominate in subsurface hydrocarbon impacted soils and groundwater, especially within LNAPL source zones. In the absence of oxygen, the anaerobic biodegradation of a wide variety of hydrocarbons is known to occur with varied soluble electron acceptors including nitrate and sulfate, with insoluble ferric iron and manganese oxides, and under methanogenic conditions where electron acceptors other than carbon dioxide are depleted.

The application of enhanced in-situ anaerobic bioremediation has been limited to treating dissolved plumes. Sulfate and/or nitrate have been introduced as electron acceptors to enhance the anaerobic bioremediation of dissolved BTEX plumes but not specifically LNAPL. U.S. Pat. No. 7,384,556 to Song et al. claims the use of "sulfur" and other nutritional sources for stimulating biodegradation in aquifers impacted with both LNAPL and DNAPL but does not indicate what form of sulfur to use, the necessary quantities of nutrients required for LNAPL biodegradation, techniques to administer the necessary quantities, how to target LNAPL impacted zones, or how to sustain the anaerobic biodegradation of LNAPL.

Currently in the bioremediation field, limited biodegradation of non-aqueous phase liquids is thought to occur due to hydrocarbon solubility constraints and microorganisms requiring an aqueous phase environment to thrive. Efforts to stimulate anaerobic hydrocarbon biodegradation have been limited to degrading aqueous phase hydrocarbons or by enhancing LNAPL hydrocarbon solubility and biodegradation using surfactants or cosolvents. U.S. Pat. No. 6,720,176 to Hince et al. provides a method to enhance the anaerobic biodegradation of hydrocarbons using a surfactant and chelating agents with a sulfate containing compound and a source of phosphate. No. 2010/0227381 to Hoag and Collins provides a method to enhance the aerobic biodegradation of LNAPL through the combined use of surfactants or cosolvents with a chemical oxidant to partially oxidize solubilized or desorbed hydrocarbons into more readily biodegradable compounds. The use of surfactants or chemical oxidants greatly increases remediation costs and can be associated with negative consequences. Surfactant addition has the potential for mobilizing hydrocarbons outside of the treatment areas, and varying results including the inhibition of biodegradation are often observed.

U.S. Pat. No. 6,787,034 to Noland and Elliott provides a method to accelerate the anaerobic biodegradation of hydrocarbons using a mixture of an adsorbent capable of adsorbing hydrocarbons, anaerobic bacteria, a sulfate-containing compound that releases sulfate over time, and a sulfide scavenging agent. The reference does not address how to accelerate the biodegradation of LNAPL as indicated based on adding a hydrocarbon adsorbent for lower concentrations of hydrocarbons. In addition, adding anaerobic bacteria capable of biodegradation hydrocarbons under sulfate-reducing conditions is not necessary as they are ubiquitous.

Therefore, there is a need for a method to stimulate and sustain the anaerobic biodegradation of LNAPL (including residual LNAPL) by enhancing the anaerobic biodegradation of LNAPL using indigenous anaerobic microorganisms to reduce or eliminate the toxicity and ecological threat of LNAPL released into the subsurface.

SUMMARY OF THE INVENTION

The present inventions solves the problems with the prior art by providing a method for treating LNAPL source zones using a cost effective LNAPL source zone technology to degrade residual LNAPL. The method accomplishes this by introducing bioremediation amendments comprising water with nutritional supplements in quantities, locations, and depths required to stimulate and sustain the anaerobic biodegradation of an LNAPL source zone. Then, monitoring the LNAPL source zone for adverse conditions that decrease anaerobic LNAPL biodegradation. Next, eliminating any identified adverse conditions to sustain LNAPL biodegradation. Finally, by maintaining the water with nutritional supplements in quantities, locations, and depths required to stimulate and sustain the anaerobic biodegradation of LNAPL. The nutritional supplements are selected from the group consisting of sulfate, nitrate, a source of phosphorous, a source of nutrient nitrogen, or a source of one or more than one trace metal. Also, the trace metal can be added in salt form or can be added as a complex nutritional supplement including yeast extracts. Normally, the trace metals are selected from the group consisting of: cobalt, copper, zinc, molybdenum, tungsten, iron, nickel, and selenium. Additionally, the method can comprise dissolving the nutritional supplements and adding the dissolved nutritional supplements into an unsaturated zone and allowing vertical infiltration to deliver the dissolved nutritional supplements to the underlying LNAPL, where the LNAPL zone is above a water table, below the water table or both above and below the water table. The addition of dissolved nutritional supplements to the unsaturated zone is accomplished by direct addition to the surface, subsurface lateral lines, surface lateral lines, vertical injection wells, horizontal injection wells, trenches, and excavations.

In another embodiment, the method also comprises the step of applying minerals to sustain dissolved phosphate, sulfate, or both phosphate and sulfate concentrations or applying oleophilic phosphates within the LNAPL zone. The minerals are selected from the group consisting gypsum, apatite, and struvite. Applying the minerals can be a subsurface application, a surface application, or both a subsurface application and a surface application depending upon the location. Injection wells targeting the depth interval of the LNAPL zone can be used to introduce the bioremediation amendments. Additionally, the bioremediation amendments can be recirculated within the LNAPL zone. Moreover, the method can comprise periodically injecting nitrate at a concentration required for the anaerobic oxidation and removal of generated hydrogen sulfide and to reestablish reactive iron minerals to sequester hydrogen sulfide to sustain appropriate conditions for biodegradation. One or more of the following are monitored in the LNAPL zone: dissolved phosphate, nitrogen, sulfate, trace metals, hydrogen sulfide, and LNAPL biodegradation activity. The trace metals that are monitored are selected from the group consisting of: cobalt, copper, zinc, molybdenum, tungsten, iron, nickel, and selenium. The method further comprises periodically adding one or more than one of the bioremediation amendments after an initial addition of the bioremediation amendments.

The bioremediation amendments are periodically added using one or more of the following application approaches: Introducing dissolved bioremediation amendments into the unsaturated zone and allowing vertical infiltration to deliver the bioremediation amendments into the underlying LNAPL zone above the water table, below the water table, or both above the water table and below the water table, where injections into the unsaturated zone are selected from the group consisting of: direct addition to the surface, subsurface lateral lines, surface lateral lines, vertical injection wells, horizontal injection wells, trenches, and excavations. Subsurface, surface or both subsurface and surface application of minerals to sustain dissolved sulfate, phosphate, or both sulfate and phosphate concentrations within the LNAPL zone. Introducing bioremediation amendments using injection wells targeting the depth interval of the LNAPL zone. Recirculating bioremediation amendments within the LNAPL zone to sustain appropriate conditions for LNAPL biodegradation. The sparingly soluble minerals are selected from the group consisting of: gypsum, apatite, struvite or both apatite and struvite.

In another embodiment, there is also provided a method for treating LNAPL source zones using a cost effective LNAPL source zone technology to degrade residual LNAPL. The method comprises first, identifying conditions in an LNAPL zone. Then, calculating LNAPL zone characteristics. Next, calculating injection to adjust conditions in the LNAPL zone. Then, adding water and nutrients to LNAPL zone. Next, monitoring conditions in the LNAPL zone. Then, determining if the monitored conditions require additional water and nutrients to be added. Next, determining if adjustments to the water and nutrients are necessary. Then, repeating steps based upon whether or not adjustments are necessary, and finally, determining if LNAPL remediation is complete.

In one embodiment, there is also provided a method for treating LNAPL source zones using a cost effective LNAPL source zone technology to degrade residual LNAPL. The method comprising the steps of first, introducing bioremediation amendments comprising water with nutritional supplements in quantities, locations, and depths required to stimulate and sustain the anaerobic biodegradation of an LNAPL source zone. Then, eliminating any identified adverse conditions to sustain LNAPL biodegradation. Finally, maintaining the water with nutritional supplements in quantities, locations, and depths required to stimulate and sustain the anaerobic biodegradation of LNAPL. The method further comprises the step of monitoring the LNAPL source zone for adverse conditions that decrease anaerobic LNAPL biodegradation.

In one embodiment, there is also provided a method for treating LNAPL source zones using a cost effective LNAPL source zone technology to degrade residual LNAPL, comprising first introducing bioremediation amendments comprising water with nutritional supplements in quantities, locations, and depths required to stimulate and sustain the anaerobic biodegradation of an LNAPL source zone. Then, monitoring the LNAPL source zone for adverse conditions that decrease anaerobic LNAPL biodegradation. Finally, maintaining the water with nutritional supplements in quantities, locations, and depths required to stimulate and sustain the anaerobic biodegradation of LNAPL. The method further comprises the step of eliminating any identified adverse conditions to sustain LNAPL biodegradation.

In one embodiment there is provided a method for treating LNAPL source zones using a cost effective LNAPL source zone technology to degrade residual LNAPL, comprising introducing bioremediation amendments comprising water with nutritional supplements in quantities, locations, and depths required to stimulate and sustain the anaerobic biodegradation of an LNAPL source zone. The method further comprises monitoring the LNAPL source zone for adverse conditions that decrease anaerobic LNAPL biodegradation. Then, eliminating any identified adverse conditions to sustain LNAPL biodegradation. Finally, maintaining the water with nutritional supplements in quantities, locations, and depths required to stimulate and sustain the anaerobic biodegradation of LNAPL.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a method for treating LNAPL source zones using a cost effective LNAPL source zone technology to degrade residual LNAPL, and to allow for a more rapid transition to monitored natural biodegradation and attenuation. This in-situ technology is consistent with some states that require treatment, removal or containment of free or residual product, where removal or containment may not be the most appropriate, practical or cost-effective solution.

The method disclosed herein stimulates native, non-engineered anaerobic microorganisms to degrade LNAPL hydrocarbons in the absence of costly, and difficult to implement, chemical or physical means to increase hydrocarbon solubility and bioavailability. Therefore, the present method can be economically applied at a large scale, unlike the prior art.

The ability of anaerobic microorganisms to degrade LNAPL has been demonstrated by the depletion of LNAPL hydrocarbons in petroleum impacted aquifers and crude oil reservoirs throughout the world wherein crude oil has been altered to viscous immobile oils depleted of more labile hydrocarbons by natural anaerobic biodegradation.

The disclosed method evaluates the nutrient quantities required for biodegrading non-aqueous phase hydrocarbon. This stimulates and sustains the anaerobic biodegradation of LNAPL in the subsurface at petroleum release sites. Additionally, there is provided a process to enhance and sustain the anaerobic biodegradation of LNAPL using injection and distribution techniques that target LNAPL-impacted zones. Larger quantities and/or longer-lasting nutritional stimulants needed for LNAPL biodegradation relative to dissolved hydrocarbon plumes are used as are steps to monitor and maintain LNAPL biodegradation for extended periods.

It is understood that each remediation site will have significant spatial and temporal variability in subsurface conditions that may require alternative field methodologies to stimulate anaerobic LNAPL biodegradation. The site-specific factors limiting anaerobic LNAPL biodegradation including LNAPL/water contact and nutritional limitations are first identified or assumed depending on site conditions.

The method includes the addition of large quantities of slow release sulfate sources including gypsum with oleophilic phosphates or mineral phosphates using the addition and distribution techniques that target the LNAPL zones versus indiscriminate applications.

Because of the large quantity of hydrocarbon contained within LNAPL, anaerobic biodegradation must be maintained over long periods of time during which different environmental conditions may limit biodegradation. Anaerobic LNAPL biodegradation is therefore monitored and sustained by making adjustments as indicated by monitoring results.

This monitoring step is a key component of the invention because differences in the hydrology, geochemistry, and hydrocarbon distribution, coupled with the long duration required to biodegrade LNAPL prevent accurate predictions of such adjustments as attempted by the prior art. Steps to sustain anaerobic LNAPL biodegradation in this invention include repeated nutrient injections, sustaining water and nutrient availability within the LNAPL zone including in zones with LNAPL trapped above the water table, and cycling redox conditions and electron acceptors.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

The following description is provided to enable any person skilled in the art to make and use the invention and sets forth the best modes contemplated by the inventor, but does not limit the variations available.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc.

Residual LNAPL contained within soil porosity represents the vast majority of hydrocarbon present within an aquifer impacted with petroleum sources including gasoline, diesel, crude oil, and/or other petroleum products. A small fraction of the hydrocarbon present at petroleum release sites is present in the dissolved phase relative to residual LNAPL.

Referring to Table 1, there is shown a comparison of dissolved hydrocarbon concentrations and hydrocarbons in soil, representative of various site conditions.

TABLE 1

Comparison of the concentration of
dissolved hydrocarbons and hydrocarbons in soil
representative of sites impacted with gasoline and diesel LNAPL.

| LNAPL Type | Representative composition | Dissolved Hydrocarbons in Groundwater (mg/L TPH)[1] | Residual LNAPL Saturation (%) | TPH in soil (mg/Kg)[2] | LNAPL Area Volume (ft$^3$) |
|---|---|---|---|---|---|
| Fresh Gasoline | C8H18 | 354 | 10 | 32,700 | 120,000 |
| Weathered Gasoline | C8H18 | 35.4 | 10 | 32,700 | 120,000 |
| Fresh Diesel | C12H23 | 5.2 | 10 | 17,000 | 120,000 |
| Weathered Diesel | C12H23 | 0.5 | 10 | 17,000 | 120,000 |

[1]From fuel/water partitioning experiments (Geosphere Inc., 2006)
[2]Representative of measured values (Brost et. al, 2000)

Referring to Table 2, there is shown a comparison of total hydrocarbon (as TPH) and sulfate requirements between groundwater and residual LNAPL.

TABLE 2

Comparison of total hydrocarbon quantity and
sulfate requirements for groundwater and residual LNAPL.

| LNAPL Type | Total TPH | | Sulfate Requirements[1] | |
|---|---|---|---|---|
| | Dissolved in Groundwater (Kg) | In Residual LNAPL (Kg) | For TPH Dissolved in Groundwater (Kg) | For Residual LNAPL (Kg) |
| Fresh Gasoline | 360 | 183,000 | 950 | 482,000 |
| Weathered Gasoline | 36.0 | 183,000 | 95.0 | 482,000 |
| Fresh Diesel | 5.3 | 95,000 | 9.6 | 170,000 |
| Weathered Diesel | 0.53 | 95,000 | 0.96 | 170,000 |

[1]Determined by balancing electron transfer between TPH biodegradation and sulfate reduction.

The calculations in Table 2 were made to illustrate this point and to determine the quantity of electron acceptor (as sulfate) required to degrade hydrocarbons present in residual LNAPL, and for comparison, in groundwater within LNAPL source zones. The LNAPL source zone was assumed to be 3 feet in thickness over a 200-foot by 200-foot area. Mobile LNAPL was assumed to not be present due to past LNAPL removal efforts by pumping, resulting in residual and non-recoverable LNAPL saturation at 10% of the soil porosity.

This scenario is consistent with conditions found at many petroleum release sites. Moreover, multiple residual LNAPL plumes can be present within any given site, especially refineries and terminals. Four scenarios were evaluated including two gasoline, and two diesel residual LNAPL zones. Recent releases of gasoline and diesel were evaluated by assuming dissolved TPH at a concentration in equilibrium with fresh (not water washed) LNAPL (Geosphere, 2006). A slightly "weathered" condition was also evaluated by assuming one order of magnitude lower concentrations of dissolved hydrocarbons, while maintaining the residual LNAPL content constant. As shown in Table 2, the total quantity of hydrocarbon present in residual LNAPL exceeds that of dissolved hydrocarbons within the residual LNAPL impacted zone by factors of approximately 500 for fresh gasoline, 5,000 for weathered gasoline, 18,000 for fresh diesel, and 180,000 for weathered diesel examples. Likewise the quantity of sulfate required to support the biodegradation of residual LNAPL exceeds that required for dissolved hydrocarbons by the same amounts.

The calculations in Table 2 clearly show that conventional approaches to stimulate the biodegradation of dissolved hydrocarbons yield orders of magnitude less electron acceptor and/or other nutrients required for residual LNAPL. The prior art, as shown in U.S. Pat. No. 7,138,060 to Cuthbertson, attempts to estimate sulfate injection quantities based on plume volume and sulfate concentration contaminant limits. This is irrelevant to the quantity of sulfate required to biodegrade LNAPL. The quantities required for residual LNAPL biodegradation cannot be achieved with single or even multiple short term injections of low volumes of highly concentrated solution that is allowed to dilute in groundwater as specified in the Cuthbertson reference. As discussed in the examples provided below, the current invention delivers high quantities using slow release sources of nutrients and/or through continuous or semi-continuous injections into the LNAPL zone over long periods. Adding soluble electron acceptors (nitrate and/or sulfate salts) to concentrations required, or even significantly less than what is required for residual LNAPL biodegradation, would raise the salinity to concentrations that inhibit microbial activity and biodegradation. For example, a dissolved sulfate concentration of 480,000 mg/L would be required for the biodegradation of gasoline residual LNAPL in the above example. In addition, the bulk of the added electron acceptor would not be utilized prior to being carried out of the LNAPL area with groundwater flow. Groundwater flow velocities between 50 to 500 feet/year are common and would carry injected sulfate or nitrate out of the 200 ft. LNAPL zone described above within 4 years and 0.4 years, respectively. This is insufficient time for anaerobic biodegradation to degrade residual LNAPL.

The high demand on anaerobic biodegradation within residual LNAPL zones as indicated by the calculations in Table 2, will render these areas prone to electron-acceptor depletion, nutrient depletion (example phosphorous, ammonia, and trace metals), and inhibitor (including hydrogen sulfide) accumulation relative to dissolved plumes by similar factors calculated above (500-180,000 times). Thin zones of hydrocarbon-impacted groundwater depleted of sulfate and containing hydrogen sulfide have been observed by collecting multiple, closely spaced water samples with depth. Based on the quantity of sulfate required to biodegrade residual LNAPL, reactive iron in groundwater and soils is likely not sufficient to precipitate generated hydrogen sulfide and to maintain low hydrogen sulfide concentrations over time. These adverse conditions are likely to go unrecognized using conventional monitoring wells that do not specifically target the depth interval of residual LNAPL zones.

In light of the calculations in Table 2 above, the method includes slow release sources of sulfate and phosphate and/or continual or semi-continuous injections of soluble nutrients over multiple years to maintain of electron acceptors and nutrient concentrations using injection and/or distribution techniques that specifically target the LNAPL-impacted zones.

Figure 1:
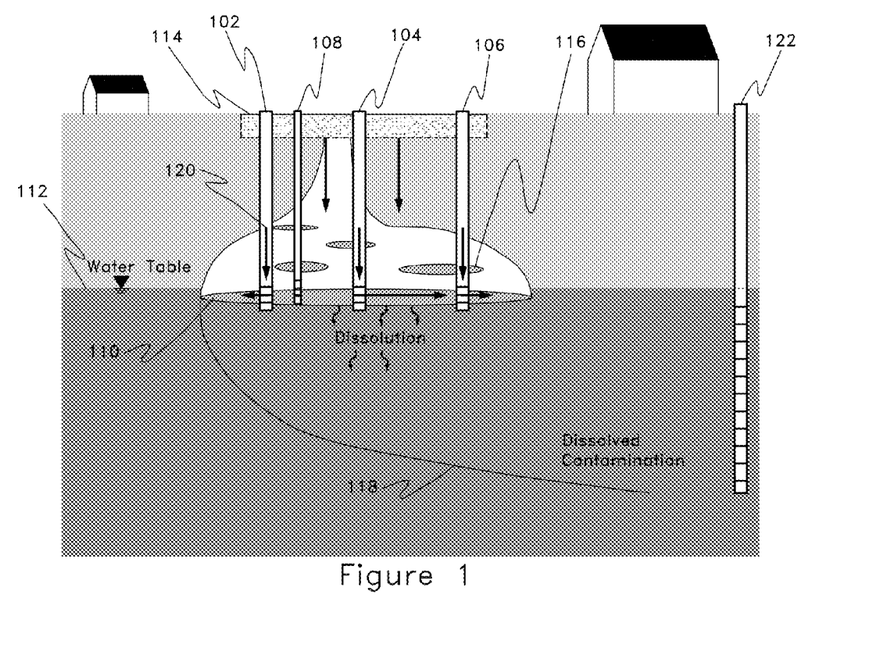
FIG. 1 is a diagram of a method demonstrating a slow continual injection into a residual LNAPL zone at a water table with slow release nutrients for residual LNAPL above a water table.

Referring now to FIG. 1, there is shown a diagram 100 of a method demonstrating a slow continuous injection of a nutrient solution into residual LNAPL 110 zone at a water table 112 using wells 102, 104 and 106 with slow release nutrients 114 for residual LNAPL 110 above the water table 112. As can be seen, LNAPL 110 is a contaminant that is mainly insoluble and has a lower density than water in the water table 112. Once LNAPL 110 infiltrates through the soil, it will accumulate at the water table 112 since LNAPL 110 is less dense than water. Dissolved hydrocarbon plumes 118 in the subsurface emanating from LNAPL 110 source zones at petroleum release sites often represent the primary threat to receptors including public water supply wells and surface water bodies. The desired end-point is the depletion of contaminants of concern (COCs) from LNAPL 110 to significantly reduce or eliminate dissolved hydrocarbon plumes 118. This is accomplished by stimulating the biodegradation of LNAPL 110 and 116 using native anaerobic microorganisms 114. The invention does not include chemical or physical LNAPL pre-treatment prior to bioremediation or as part of the anaerobic bioremediation process which have largely been assumed to be required to enhance LNAPL biodegradation. Treating dissolved hydrocarbons 118 is a consequence of LNAPL 110 source zone treatment, not efforts specifically designed to degrade dissolved hydrocarbons.

As can be seen, a nutrient solution 120 is injected within a thin residual LNAPL 110 zone located at and beneath the water table 112 by injection site wells 102, 104 and 106. The anaerobic biodegradation of residual LNAPL 116 located above the water table in this example is accelerated by adding mineral sources of electron acceptor such as gypsum, and/or mineral sources of phosphorous, including apatite, to surface soils. As can be seen, the nutrients 114 are slowly released into the residual LNAPL zones 116 above the water table from trenches or surface applications. The slow release nutrients are replenished as needed until remediation is complete. Monitoring well 108, designed to monitor groundwater conditions in the thin residual LNAPL zone 110 at and below the water table, is used to monitor for nutrient and electron acceptor depletion, and the potential for inhibitor accumulation including dissolved hydrogen sulfide. Additional electron acceptor and/or nutrients (including phosphate) are supplemented using the injection wells as needed based on monitoring results. Should hydrogen sulfide accumulate to potentially inhibitory concentrations (generally greater than 1 mmol/L), nitrate is periodically added to wells 102, 104, and 106. The progress of biodegradation and remediation is monitored at a well 108 that has a depth adequate to determine whether conditions need to be adjusted to maintain LNAPL biodegradation, if the groundwater still contains dissolved contamination, or if the remediation is complete. A typical monitoring well 122 used to monitor conditions within the dissolved plume 118 is shown for comparison.

Figure 2:
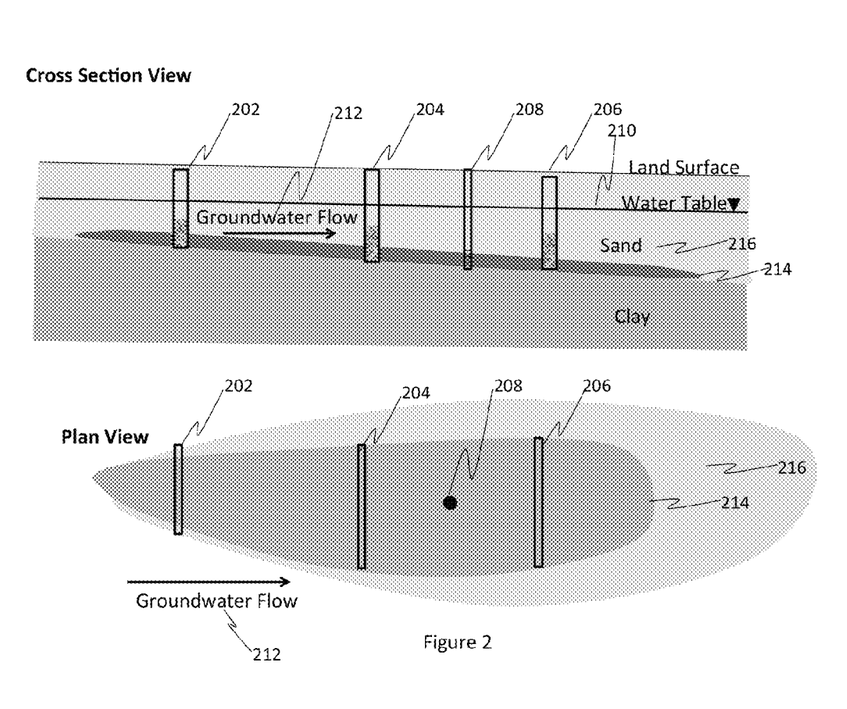
FIG. 2 is a cross-sectional and plan view diagram of a method demonstrating slow release of nutrients added to shallow trenches below a water table, where the trenches are oriented perpendicular to groundwater flow.

Referring now to FIG. 2, there is shown a cross-sectional and plan view diagram 200 of a method demonstrating slow release of nutrients added to shallow trenches 202, 204 and 206 below the water table 210 oriented perpendicular to groundwater flow. The diagram 200 illustrates this second method for bioremediation that comprises adding mineral sulfate and/or phosphate sources into shallow trenches 202, 204 and 206 installed beneath the shallow water table 210. The trenches 202, 204 and 206 are oriented perpendicular to groundwater flow 212 to allow sulfate and/or phosphate sources from the dissolution of added minerals to transport with groundwater flow 212 through the residual LNAPL zone 214 trapped beneath the water table 210. The need for additional trenching with space or time is determined by monitoring dissolved sulfate and phosphate concentrations within the LNAPL zone 214 using well 208. If sulfate and phosphate become depleted, additional mineral sources of phosphate and sulfate are added.

As indicated in the above examples, after initial efforts are made to accelerate anaerobic biodegradation, different limitations are prone to develop due to the high demand on biodegradation to degrade LNAPL within localized zones 214. Therefore, monitoring key parameters within the LNAPL zones 214 and making necessary adjustments to ensure LNAPL biodegradation is sustained over extended periods is required to complete remediation. While monitoring and adjusting in-situ bioremediation is common, monitoring specifically within the LNAPL zone 214 over long periods of time is necessary to assure that anaerobic LNAPL biodegradation has not occurred.

Figure 3:
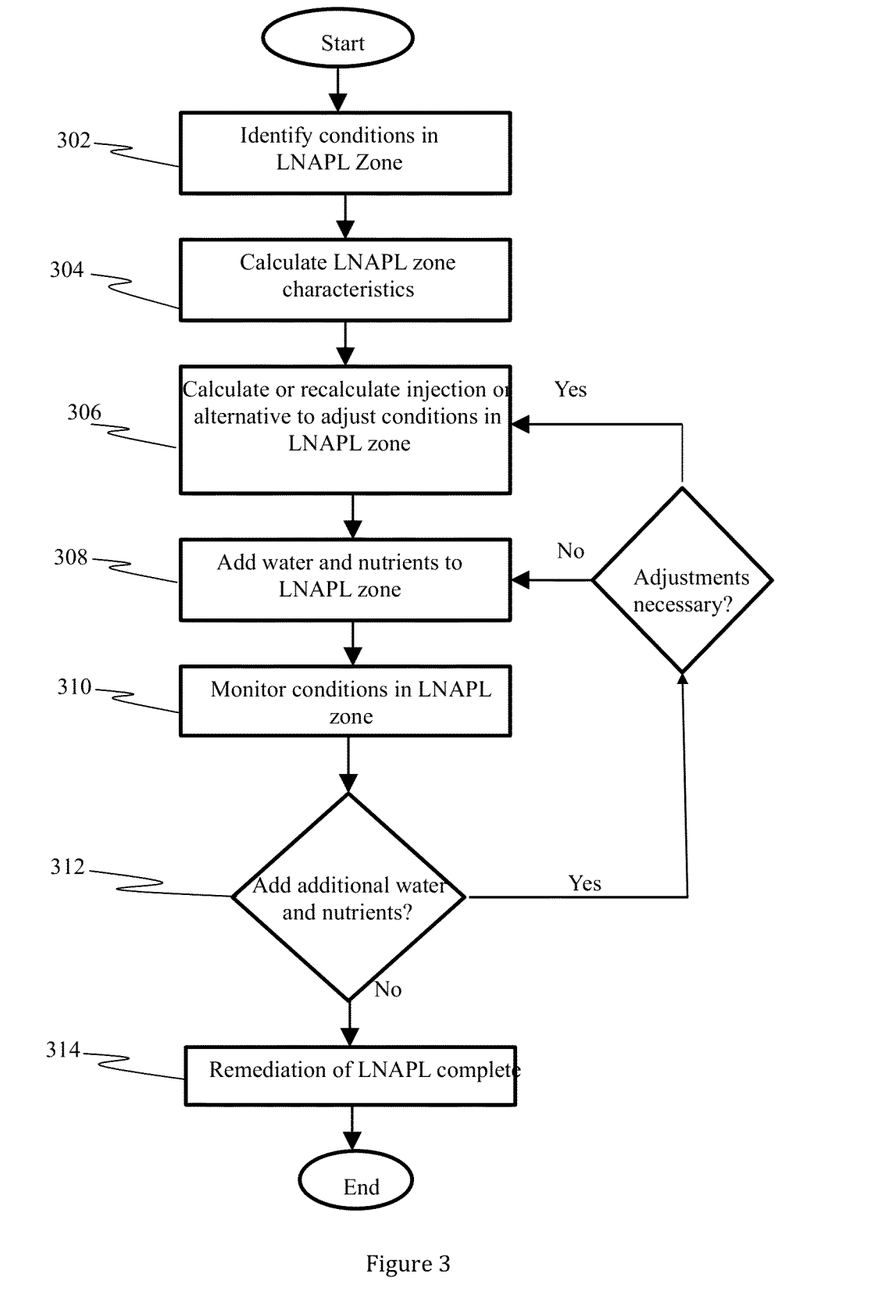
FIG. 3 is a flowchart diagram of an anaerobic LNAPL biodegradation process according to one embodiment.

Referring now to FIG. 3, there is shown a flowchart diagram 300 of an anaerobic LNAPL biodegradation process according to one embodiment of the present invention. As can be seen, the flowchart 300 illustrates monitoring used to determine if, when, and what specific adjustments are needed within the LNAPL zone. Monitoring and adjusting the anaerobic LNAPL bioremediation process continues until an acceptable end point is achieved based on reduction of dissolved hydrocarbons of concern within the residual LNAPL zone.

First, a determination 302 is made to identify specific limitations to anaerobic biodegradation based on conditions and measurements conducted within the LNAPL zone with regard to the LNAPL and water saturation, methane, hydrogen sulfide, phosphate, ammonia, trace metals and pH of the zone. Alternatively, if no determination can be made, assumptions regarding the specific limitations to anaerobic biodegradation are made based on site history, hydrocarbon distribution, geology, hydrology, and/or other information. The injection or alternative addition approach is designed 306 based on the calculated LNAPL zone characteristics 304, such as, for example, the depth of the LNAPL zone and the water table, LNAPL zone thickness and distribution, if the LNAPL is above or below the water table, and groundwater flow velocity. Then, the water and stimulants are injected, or an alternative approach is used to add the bioremediation amendments to the LNAPL zone 308.

Next, long-term monitoring 310 is performed on the conditions within the LNAPL zone to determine if adjustments 316 to the bioremediation process or to the calculations are needed. Adjustments to the type of amendment, the amount, addition frequency and the addition method of the bioremediation amendments are made 312 until LNAPL has been remediated 314.

What has been described is a new and improved method for treating LNAPL source zones using a cost effective LNAPL source zone technology to degrade residual LNAPL, and to allow for a more rapid transition to monitored natural biodegradation and attenuation overcoming the limitations and disadvantages inherent in the related art.

Although the present invention has been described with a degree of particularity, it is understood that the present disclosure has been made by way of example. As various changes could be made in the above description without departing from the scope of the invention, it is intended that all matter contained in the above description or shown in the accompanying drawings shall be illustrative and not used in a limiting sense.

What is claimed is:

1. A method for treating LNAPL source zones using a cost effective LNAPL source zone technology to degrade residual LNAPL, the method comprising the steps of:
   a) introducing bioremediation amendments comprising water with nutritional supplements in quantities, locations, and depths required to stimulate and sustain the anaerobic biodegradation of an LNAPL source zone;
   b) monitoring the LNAPL source zone for adverse conditions that decrease anaerobic LNAPL biodegradation;
   c) eliminating any identified adverse conditions to sustain LNAPL biodegradation; and
   d) maintaining the water with nutritional supplements in quantities, locations, and depths required to stimulate and sustain the anaerobic biodegradation of LNAPL.

2. The method of claim 1, where the nutritional supplements are selected from the group consisting of sulfate, nitrate, a source of phosphorus, a source of nutrient nitrogen, or a source of one or more than one trace metal.

3. The method of claim 2, where the one or more than one trace metal can be added in salt form.

4. The method of claim 2, where the one or more than one trace metal can be added as a complex nutritional supplement including yeast extracts.

5. The method of claim 2, where the trace metals are selected from the group consisting of: cobalt, copper, zinc, molybdenum, tungsten, iron, nickel, and selenium.

6. The method of claim 2, further comprising dissolving the nutritional supplements and adding the dissolved nutritional supplements into an unsaturated zone and allowing vertical infiltration to deliver the dissolved nutritional supplements to the underlying LNAPL, where the LNAPL zone is above a water table, below the water table or both above and below the water table.

7. The method of claim 6, where adding the dissolved nutritional supplements to the unsaturated zone is accomplished through one of the group consisting of direct addition to the surface, subsurface lateral lines, surface lateral lines, vertical injection wells, horizontal injection wells, trenches, and excavations.

8. The method of claim 2, further comprising the step of applying minerals to sustain dissolved phosphate, sulfate, or both phosphate and sulfate concentrations within the LNAPL zone.

9. The method of claim 8, where the minerals are selected from the group consisting gypsum, apatite, and struvite.

10. The method of claim 2, further comprising the step of applying oleophilic phosphates.

11. The method of claim 8, where applying the minerals can be a subsurface application, a surface application, or both a subsurface application and a surface application.

12. The method of claim 2, where the step of introduction of bioremediation amendments further comprises using injection wells targeting the depth interval of the LNAPL zone.

13. The method of claim 2, further comprising the step of recirculating bioremediation amendments within the LNAPL zone.

14. The method of claim 2, further comprising the step of periodically injecting nitrate at a concentration required for the anaerobic oxidation and removal of generated hydrogen sulfide and to reestablish reactive iron minerals to sequester hydrogen sulfide to sustain appropriate conditions for biodegradation.

15. The method of claim 1, where the step of monitoring monitors one or more of the following in the LNAPL zone: dissolved phosphate, nitrogen, sulfate, trace metals, hydrogen sulfide, and LNAPL biodegradation activity.

16. The method of claim 13, where the trace metals are selected from the group consisting of: cobalt, copper, zinc, molybdenum, tungsten, iron, nickel, and selenium.

17. The method of claim 2 further comprises periodically adding one or more than one of the bioremediation amendments of claim 2 after an initial addition of the bioremediation amendments.

18. The method of claim 15, where the one or more than one bioremediation amendments are periodically added using one or more of the following application approaches:
   a) introducing dissolved bioremediation amendments into the unsaturated zone and allowing vertical infiltration to deliver the bioremediation amendments into the underlying LNAPL zone above the water table, below the water table, or both above the water table and below the water table, where injections into the unsaturated zone are selected from the group consisting of direct addition to the surface, subsurface lateral lines, surface lateral lines, vertical injection wells, horizontal injection wells, trenches, and excavations;
   b) subsurface, surface or both subsurface and surface application of minerals to sustain dissolved sulfate, phosphate, or both sulfate and phosphate concentrations within the LNAPL zone;
   c) introducing bioremediation amendments using injection wells targeting the depth interval of the LNAPL zone; and
   d) recirculating bioremediation amendments within the LNAPL zone to sustain appropriate conditions for LNAPL biodegradation.

19. The method of claim 18, where the sparingly soluble minerals are selected from the group consisting of: gypsum, apatite, struvite or both apatite and struvite.

20. A method for treating LNAPL source zones using a cost effective LNAPL source zone technology to degrade residual LNAPL, the method comprising the steps of:
   a) identifying conditions in an LNAPL zone;
   b) calculating LNAPL zone characteristics;
   c) calculating injection to adjust conditions in LNAPL zone;
   d) adding water and nutrients to LNAPL zone;
   e) monitoring conditions in the LNAPL zone;
   f) determining if the monitored conditions require additional water and nutrients to be added;
   g) determining if adjustments to the water and nutrients of step f) are necessary;
   h) repeating steps d) through f) if no adjustments are necessary;
   i) repeating steps c) through f) if adjustments are necessary; and
   j) determining if LNAPL remediation is complete.

21. A method for treating LNAPL source zones using a cost effective LNAPL source zone technology to degrade residual LNAPL, the method comprising the steps of:
   a) introducing bioremediation amendments comprising water with nutritional supplements in quantities, locations, and depths required to stimulate and sustain the anaerobic biodegradation of an LNAPL source zone;
   b) eliminating any identified adverse conditions to sustain LNAPL biodegradation; and
   c) maintaining the water with nutritional supplements in quantities, locations, and depths required to stimulate and sustain the anaerobic biodegradation of LNAPL.

22. The method of claim 21, further comprising the step of monitoring the LNAPL source zone for adverse conditions that decrease anaerobic LNAPL biodegradation.

23. A method for treating LNAPL source zones using a cost effective LNAPL source zone technology to degrade residual LNAPL, the method comprising the steps of:
   a) introducing bioremediation amendments comprising water with nutritional supplements in quantities, locations, and depths required to stimulate and sustain the anaerobic biodegradation of an LNAPL source zone;
   b) monitoring the LNAPL source zone for adverse conditions that decrease anaerobic LNAPL biodegradation; and
   c) maintaining the water with nutritional supplements in quantities, locations, and depths required to stimulate and sustain the anaerobic biodegradation of LNAPL.

24. The method of claim 23, further comprising the step of eliminating any identified adverse conditions to sustain LNAPL biodegradation.

* * * * *